US012604078B2

(12) United States Patent

Hirabayashi et al.

(10) Patent No.: US 12,604,078 B2

(45) Date of Patent: Apr. 14, 2026

(54) CAMERA

(71) Applicants: NIDEC PRECISION CORPORATION, Tokyo (JP); FUJIFILM CORPORATION, Tokyo (JP)

(72) Inventors: Koichi Hirabayashi, Tokyo (JP); Hisashi Tasaka, Tokyo (JP)

(73) Assignees: NIDEC PRECISION CORPORATION, Tokyo (JP); FUJIFILM CORPORATION, Tokyo (JP)

( * ) Notice: Subject to any disclaimer, the term of this patent is extended or adjusted under 35 U.S.C. 154(b) by 86 days.

(21) Appl. No.: 18/439,674

(22) Filed: Feb. 12, 2024

(65) Prior Publication Data

US 2024/0276092 A1    Aug. 15, 2024

(30) Foreign Application Priority Data

Feb. 15, 2023    (JP) ................................. 2023-021958

(51) Int. Cl.
H04N 23/60    (2023.01)
H04N 23/51    (2023.01)

(52) U.S. Cl.
CPC ............. H04N 23/60 (2023.01); H04N 23/51 (2023.01)

(58) Field of Classification Search
CPC ............................... H04N 23/60; H04N 23/51
USPC ......................................................... 348/374
See application file for complete search history.

(56) References Cited

U.S. PATENT DOCUMENTS

| | | | |
|---|---|---|---|
| 3,363,528 A | 1/1968 | Winkler et al. |
| 4,593,983 A | 6/1986 | Launie et al. |
| 5,749,009 A | 5/1998 | Naka et al. |
| 6,587,645 B1 | 7/2003 | Chan |
| 6,597,865 B1 | 7/2003 | Negishi et al. |

FOREIGN PATENT DOCUMENTS

| | | |
|---|---|---|
| JP | 2000010183 A | 1/2000 |
| JP | 2000089347 A | 3/2000 |
| JP | 2009271407 A | 11/2009 |

OTHER PUBLICATIONS

Extended European Search Report in EP Application No. 24155259.5 dated Jul. 25, 2024. 7pp.

*Primary Examiner* — Joel W Fosselman
(74) *Attorney, Agent, or Firm* — HAUPTMAN HAM, LLP

(57) ABSTRACT

A camera includes a counter rotatable about a support shaft, a spring that urges the counter in a first rotation direction, a rotary member and a drive cam that rotate the counter in a direction opposite to the first rotation direction, a stopper rotatable about the support shaft, and a spring that urges the stopper in a second rotation direction. The counter includes an outer circumferential surface that changes an indication in a circumferential direction, and a first engagement portion including a plurality of projections. The stopper includes contact tabs that receive a force acting in a direction opposite to the second rotation direction from at least one of a film pack or a door, and an engagement tab engageable with one of the projections on the first engagement portion on the counter to restrict rotation of the counter in the first rotation direction.

6 Claims, 18 Drawing Sheets

FIG. 9B

CAMERA

RELATED APPLICATIONS

The present application claims priority to Japanese Application Number 2023-021958, filed Feb. 15, 2023, the disclosure of which is hereby incorporated by reference herein in its entirety.

BACKGROUND

Technical Field

The present invention relates to a camera, and particularly, to a camera that can indicate a count.

Description of the Background

Some cameras (instant cameras) use photographic films automatically developed after photographing. Such instant cameras can be loaded with a photographic film pack containing multiple photographic films (refer to, for example, Patent Literature 1). With each photographic film pack containing a predetermined number of photographic films, a mechanism to count the number of photographic films ejected after photographing and indicate the number of photographic films remaining in the photographic film pack is awaited.

CITATION LIST

Patent Literature

Patent Literature 1: Japanese Unexamined Patent Application Publication No. 2000-10183

BRIEF SUMMARY

In response to the above issue, one or more aspects of the present invention are directed to a camera with a simple structure that indicates a count in an intended manner.

In an aspect of the present invention, a camera with a simple structure can indicate a count in an intended manner. The camera includes a housing including a door to open and close an opening for placing and removing a photographic film pack to be loaded inside, a frame accommodated in the housing, a counter rotatable about a first support shaft on the frame, a first urging member that urges the counter in a first rotation direction about the first support shaft, a drive that rotates the counter in a direction opposite to the first rotation direction, a stopper rotatable about a second support shaft on the frame, and a second urging member that urges the stopper in a second rotation direction about the second support shaft. The counter includes a display surface that changes an indication in a circumferential direction, and a first engagement portion including a plurality of first projections aligned in the circumferential direction. The stopper includes a force receiver that receives a force acting in a direction opposite to the second rotation direction from at least one of the photographic film pack loaded inside the housing or the door closing the opening, and an engagement tab engageable with one of the plurality of first projections on the first engagement portion on the counter under a force received by the force receiver to restrict rotation of the counter in the first rotation direction.

The structure according to the above aspect of the present invention allows the counter to be rotated by the drive in a direction opposite to the first rotation direction, and the rotated counter to be held at its rotational position with the engagement tab on the stopper engaged with the first projection on the first engagement portion on the counter. Thus, activating the drive at an intended timing changes the indication on the counter. As described above, an inexpensive and compact structure can indicate a count in an intended manner without using an expensive component such as a liquid crystal display (LCD) panel or a circuit board.

BRIEF DESCRIPTION OF DRAWINGS

FIG. 9B is a left side view of the rotary member shown in FIG. 9A.

DETAILED DESCRIPTION

Figure 1:
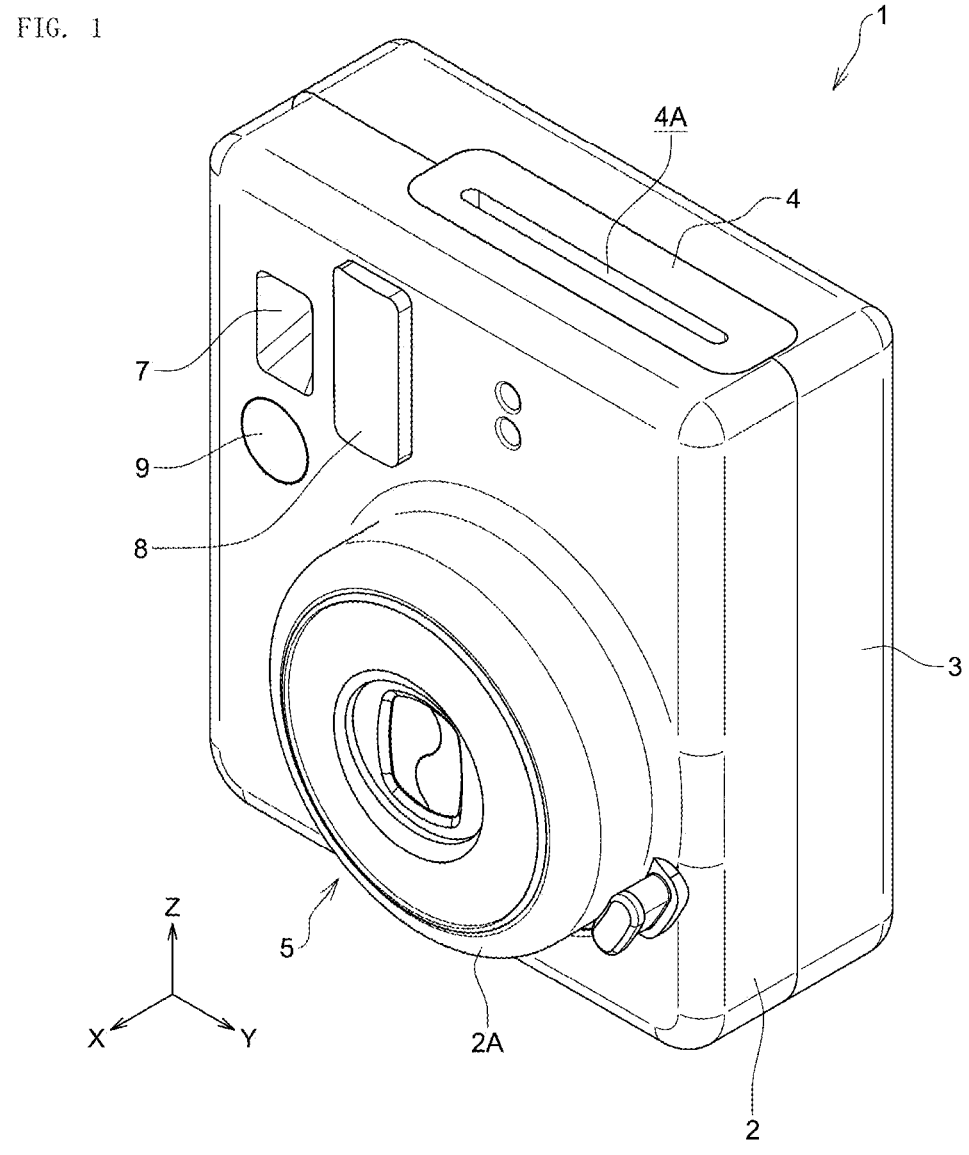
FIG. 1 is a front perspective view of a camera according to one embodiment of the present invention.

A camera according to one or more embodiments of the present invention will now be described in detail with reference to FIGS. 1 to 12E. In FIGS. 1 to 12E, like reference numerals denote like or corresponding components. Such components will not be described repeatedly. In FIGS. 1 to 12E, the scale and dimensions of each component may be exaggerated, or one or more components may not be shown. Unless otherwise specified, the terms such as first and second will be used simply to distinguish the components and will not represent a specific order or sequence.

Figure 2:
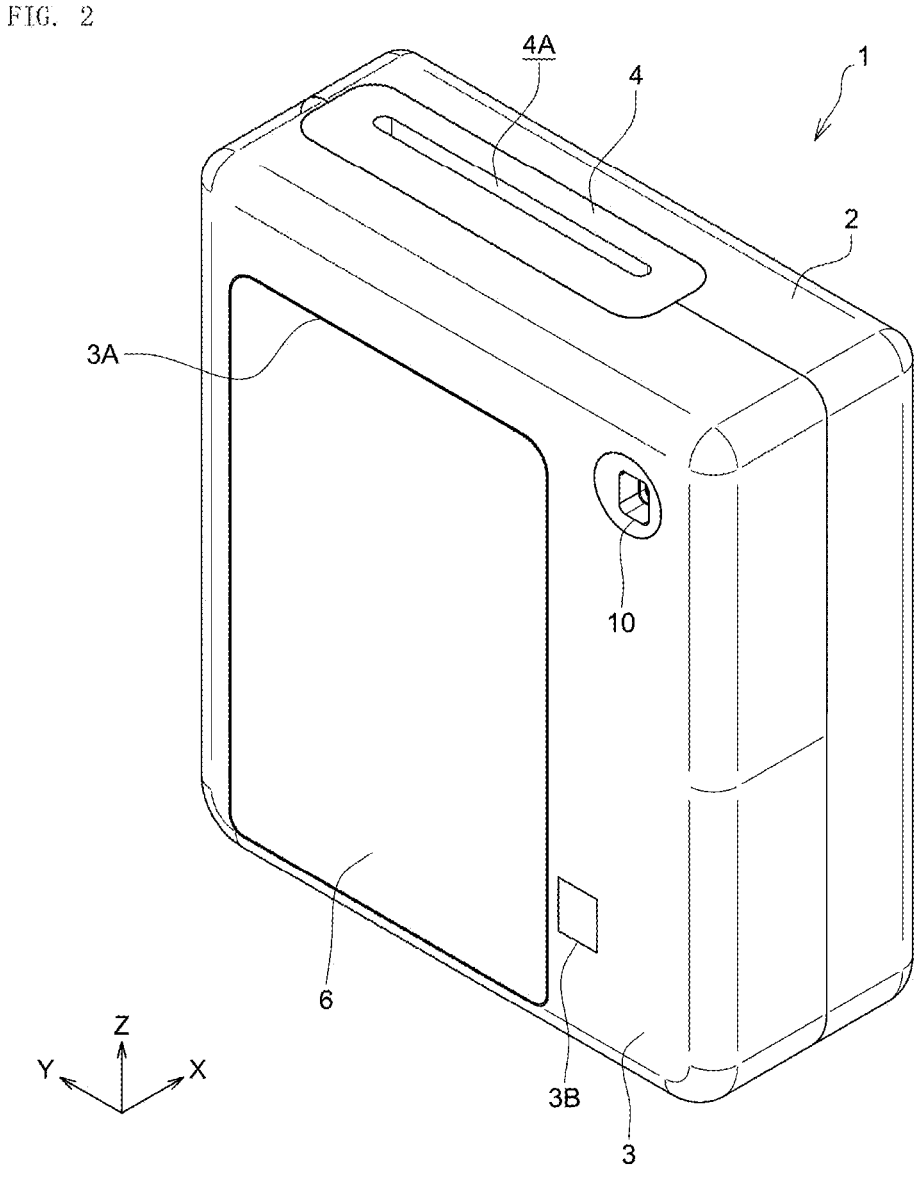
FIG. 2 is a rear perspective view of the camera shown in FIG. 1.

FIG. 1 is a front perspective view of a camera 1 according to one embodiment of the present invention. FIG. 2 is a rear perspective view of the camera 1. Although the camera 1 according to the present embodiment is a camera (instant camera) loadable with a photographic film pack (hereafter simply referred to as a film pack) containing multiple photographic films to be automatically developed after photographing, one or more embodiments of the present invention are also applicable to a camera other than such an instant camera. In the present embodiment, for ease of explanation, front or frontward refers to the positive X-direction, rear or rearward refers to the negative X-direction, up or upward refers to the positive Z-direction, down or downward refers to the negative Z-direction, right or rightward refers to the positive Y-direction, and left or leftward refers to the negative Y-direction in FIG. 1.

As shown in FIGS. 1 and 2, the camera 1 includes a front cover 2, a rear cover 3 attached to the rear of the front cover 2, a top cover 4 held between the front cover 2 and the rear cover 3, a lens barrel 5 accommodated in a cylindrical portion 2A in the front cover 2, and a door 6 attached to a rear surface of the rear cover 3. The front cover 2, the rear cover 3, the top cover 4, and the door 6 are included in a housing in the camera 1.

The front cover 2 includes a viewfinder 7. A flash window 8 is located adjacent to the viewfinder 7. A release button 9 is located in the negative Z-direction from the viewfinder 7. The top cover 4 has an ejection slit 4A extending in Y-direction, through which a photographic film developed after photographing is ejected. As shown in FIG. 2, the rear cover 3 includes a viewfinder portion 10 in which the image of a subject located frontward is formed through the viewfinder 7. A user can view the subject to be photographed and the composition through the viewfinder portion 10.

Figure 3:
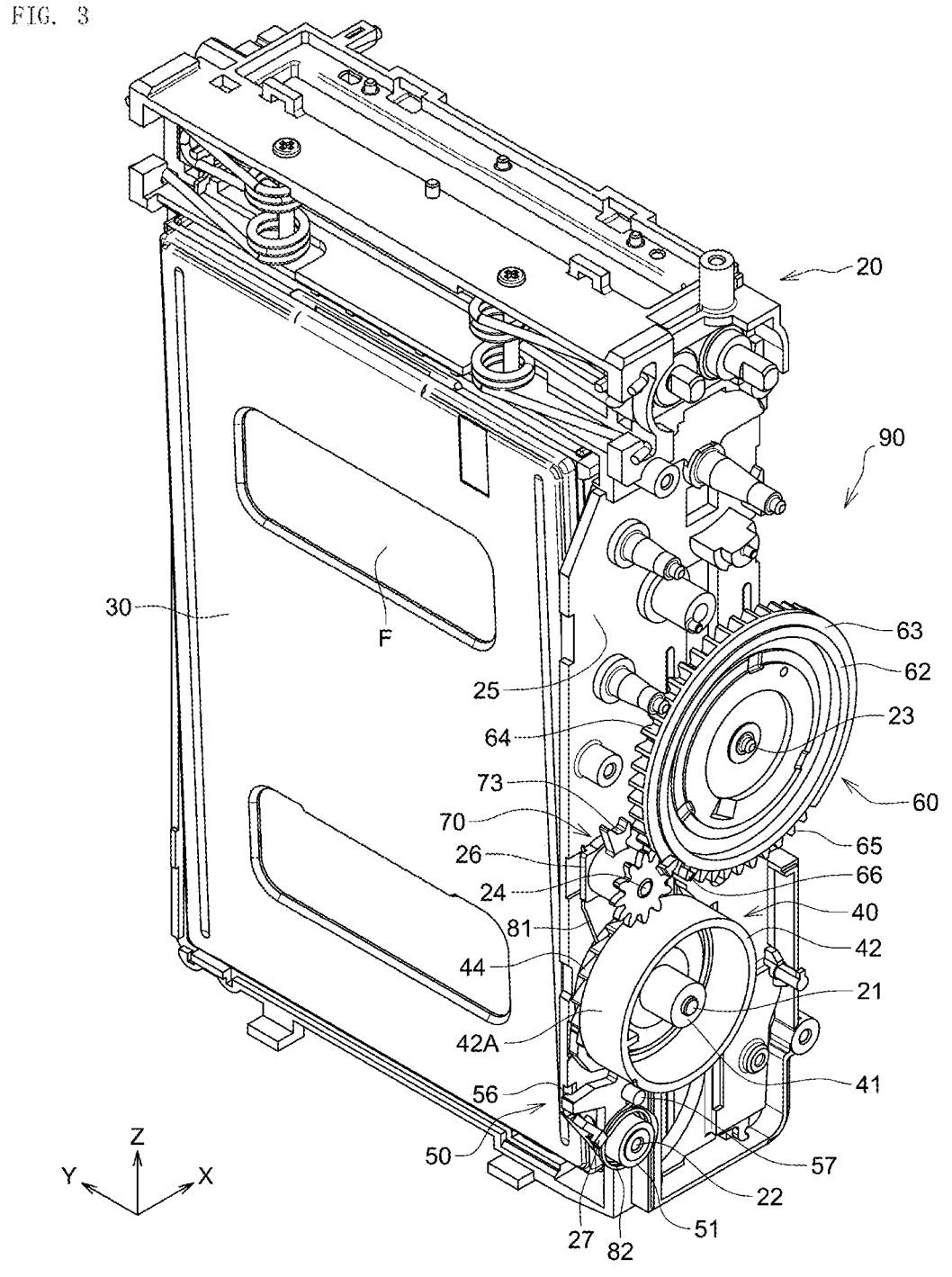
FIG. 3 is a perspective view of some of the components of the camera shown in FIG. 1 accommodated in a housing.

FIG. 3 is a perspective view of some of the components of the camera 1 accommodated in the housing. As shown in FIG. 3, a rectangular frame 20 is accommodated in an internal space defined by the front cover 2, the rear cover 3, the top cover 4, and the door 6. The frame 20 has an internal space loadable with a photographic film F being substantially a rectangular prism containing multiple photographic films. For example, a film pack 30 contains 10 photographic films for capturing a total of 10 photographs. The door 6 shown in FIG. 2 is pivotably mounted on the rear cover 3. Pivoting the door 6 relative to the rear cover 3 from a state shown in FIG. 2 to a state shown in FIG. 4 opens an opening 3A (refer to FIG. 2) in the rear cover 3 to allow the film pack 30 to be placed into and removed from an internal space S of the frame 20 through the opening 3A.

As shown in FIG. 3, a counter assembly 90 is located on a side wall 25 of the frame 20 to count the photographic films F ejected after photographing to indicate the number of photographic films F remaining in the film pack 30. The counter assembly 90 includes support shafts 21 to 24 extending in the negative Y-direction from the side wall 25, a counter 40 mounted on the support shaft 21 (first support shaft), a stopper 50 mounted on the support shaft 22 (second support shaft), a rotary member 60 mounted on the support shaft 23 (third support shaft), and a drive cam 70 mounted on the support shaft 24 (fourth support shaft). The counter 40 is rotatable about the support shaft 21. The stopper 50 is rotatable about the support shaft 22. The rotary member 60 is rotatable about the support shaft 23. The drive cam 70 is rotatable about the support shaft 24.

Figure 5A:
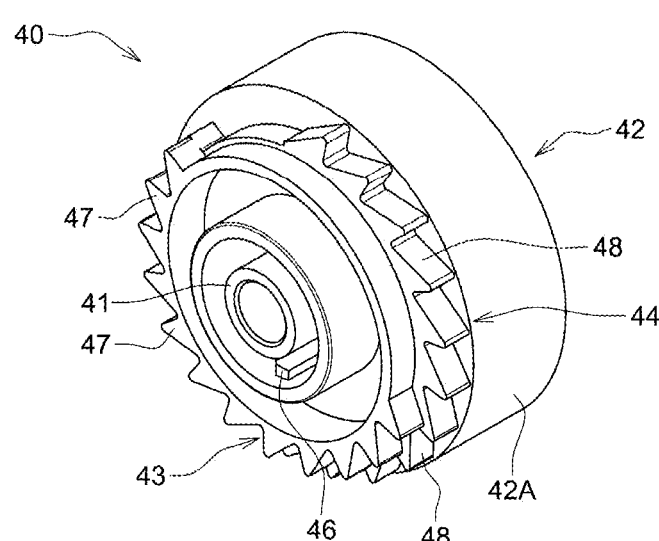
FIG. 5A is a perspective view of a counter shown in FIG. 3.
Figure 5A:
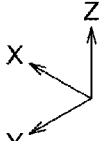
Figure 5B:
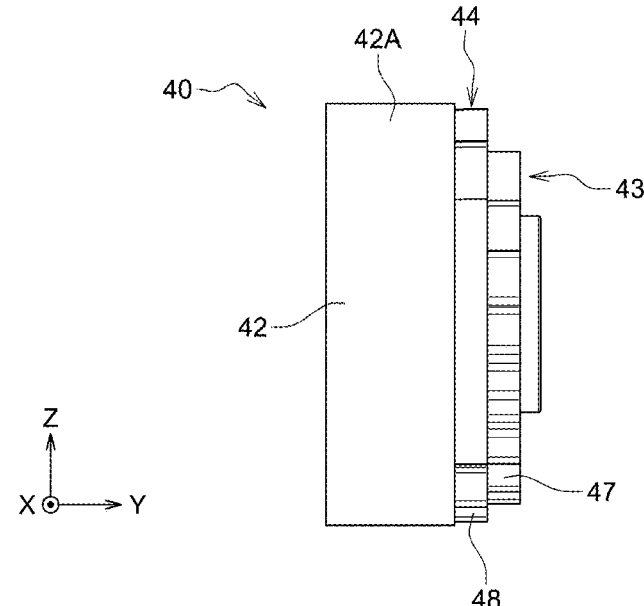
FIG. 5B is a front view of the counter shown in FIG. 5A.
Figure 5C:
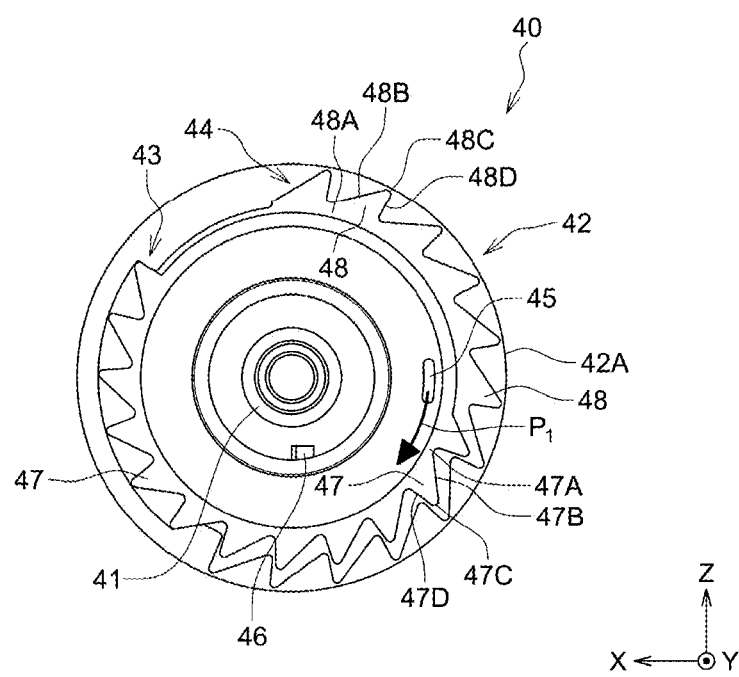
FIG. 5C is a right side view of the counter shown in FIG. 5A.

FIG. 5A is a perspective view of the counter 40. FIG. 5B is a front view of the counter 40. FIG. 5C is a right side view of the counter 40. The counter 40 indicates the number of photographic films F remaining in the film pack 30 in the internal space S of the frame 20 through a window 3B in the rear cover 3 (refer to FIG. 2). As shown in FIGS. 5A to 5C, the counter 40 includes a cylindrical bearing 41 extending in Y-direction, a cylinder 42 extending in Y-direction and having a larger diameter than the bearing 41, a first engagement portion 43 including multiple projections 47 (first projections) aligned in the circumferential direction, a second engagement portion 44 including multiple projections 48 (second projections) aligned in the circumferential direction, and a spring receiver 45 located radially inside the cylinder 42. The support shaft 21 on the frame 20 is received in the bearing 41. With the support shaft 21 received in the bearing 41, the counter 40 is rotatable about the support shaft 21.

As shown in FIG. 5C, each projection 47 on the first engagement portion 43 includes a slope 47B rising from a base 47A at a relatively small angle with respect to the tangential direction and an engagement surface 47D declining from an apex 47C of the slope 47B at an angle greater than the angle of rise of the slope 47B with respect to the tangential direction. Similarly, each projection 48 on the second engagement portion 44 includes a slope 48B rising from a base 48A at a relatively small angle with respect to the tangential direction and an engagement surface 48D declining from an apex 48C of the slope 48B at an angle greater than the angle of rise of the slope 48B relative to the tangential direction. The second engagement portion 44 is located between the cylinder 42 and the first engagement portion 43 in Y-direction and radially outward from the first engagement portion 43.

The cylinder 42 has an outer circumferential surface 42A serving as a display surface that changes indications in the circumferential direction. In the present embodiment, indications of information such as numbers and symbols (not shown) indicating the number of photographic films F remaining in the film pack 30 are on the outer circumferential surface 42A sequentially in the circumferential direction. The indication may be easily preformed using, for example, embossing, printing, or applying a sticker.

A torsion coil spring 81 (first urging member) is located across the spring receiver 45 and a spring receiver 26 (refer to FIG. 3) in the frame 20. The torsion coil spring 81 is compressed to apply an urging force $P_1$ to the counter 40 in a direction indicated by the arrow in FIG. 5C about the support shaft 21. The direction in which the urging force $P_1$ is applied about the support shaft 21 is hereafter referred to as a first rotation direction. Under no external force applied to the counter 40, the urging force $P_1$ from the torsion coil spring 81 rotates the counter 40 in the first rotation direction until a restrictor 46 located outside the bearing 41 comes in contact with a projection (not shown) on the side wall 25 of the frame 20. The position of the counter 40 rotated in the first rotation direction at which the restrictor 46 in the counter 40 comes in contact with the projection on the frame 20 is hereafter referred to as a counter stop position.

Figure 6A:
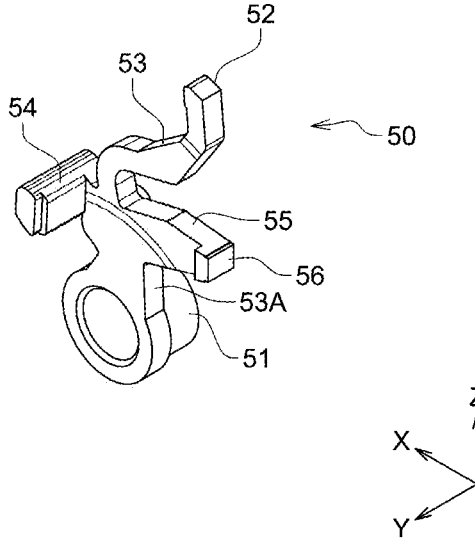
FIG. 6A is a perspective view of a stopper shown in FIG. 3.
Figure 6B:
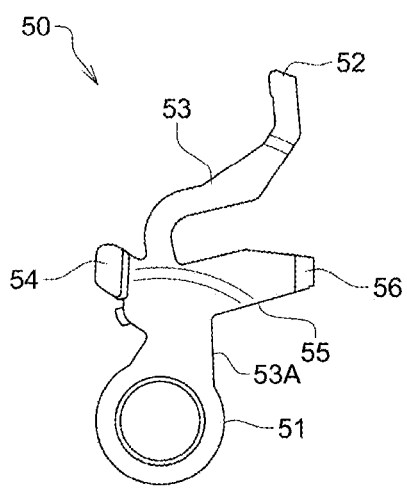
FIG. 6B is a right side view of the stopper shown in FIG. 6A.
Figure 6C:
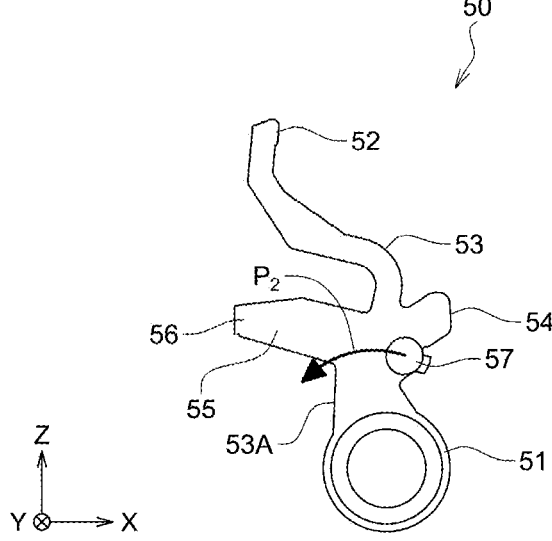
FIG. 6C is a left side view of the stopper shown in FIG. 6A.

FIG. 6A is a perspective view of the stopper 50. FIG. 6B is a right side view of the stopper 50. FIG. 6C is a left side view of the stopper 50. As shown in FIGS. 6A to 6C, the stopper 50 includes a cylindrical bearing 51, an engagement tab 52, a connector 53, a first contact tab 54 (first contactor), an arm 55, a second contract tab 56 (second contactor), and a spring receiver 57. The bearing 51 extends in Y-direction. The engagement tab 52 is engageable with the projections 47 on the first engagement portion 43 on the counter 40. The connector 53 extends from the bearing 51 to connect the bearing 51 and the engagement tab 52. The first contact tab 54 extends from the connector 53 in the positive Y-direction. The arm 55 extends from the connector 53 in the negative X-direction. The second contact tab 56 extends from a distal end of the arm 55 in the positive Y-direction. The spring receiver 57 extends from the connector 53 in the negative Y-direction. The support shaft 22 on the frame 20 is received in the bearing 51. With the support shaft 22 received in the bearing 51, the stopper 50 is rotatable about the support shaft 22.

A torsion coil spring 82 (second urging member) is located across the spring receiver 57 and a spring receiver 27 (refer to FIG. 3) in the frame 20. The torsion coil spring 82 is compressed to apply an urging force $P_2$ to the stopper 50 in a direction indicated by the arrow in FIG. 6C about the support shaft 22. The direction in which the urging force $P_2$ is applied about the support shaft 22 is hereafter referred to as a second rotation direction. Under no external force applied to the stopper 50, the urging force $P_2$ from the torsion coil spring 82 rotates the stopper 50 in the second rotation direction until a side surface 53A of the connector 53 comes in contact with the spring receiver 27 in the frame 20. The position of the rotated stopper 50 at which the side surface 53A of the connector 53 in the stopper 50 comes in contact with the spring receiver 27 in the frame 20 is hereinafter referred to as a stopper stop position.

Figure 4:
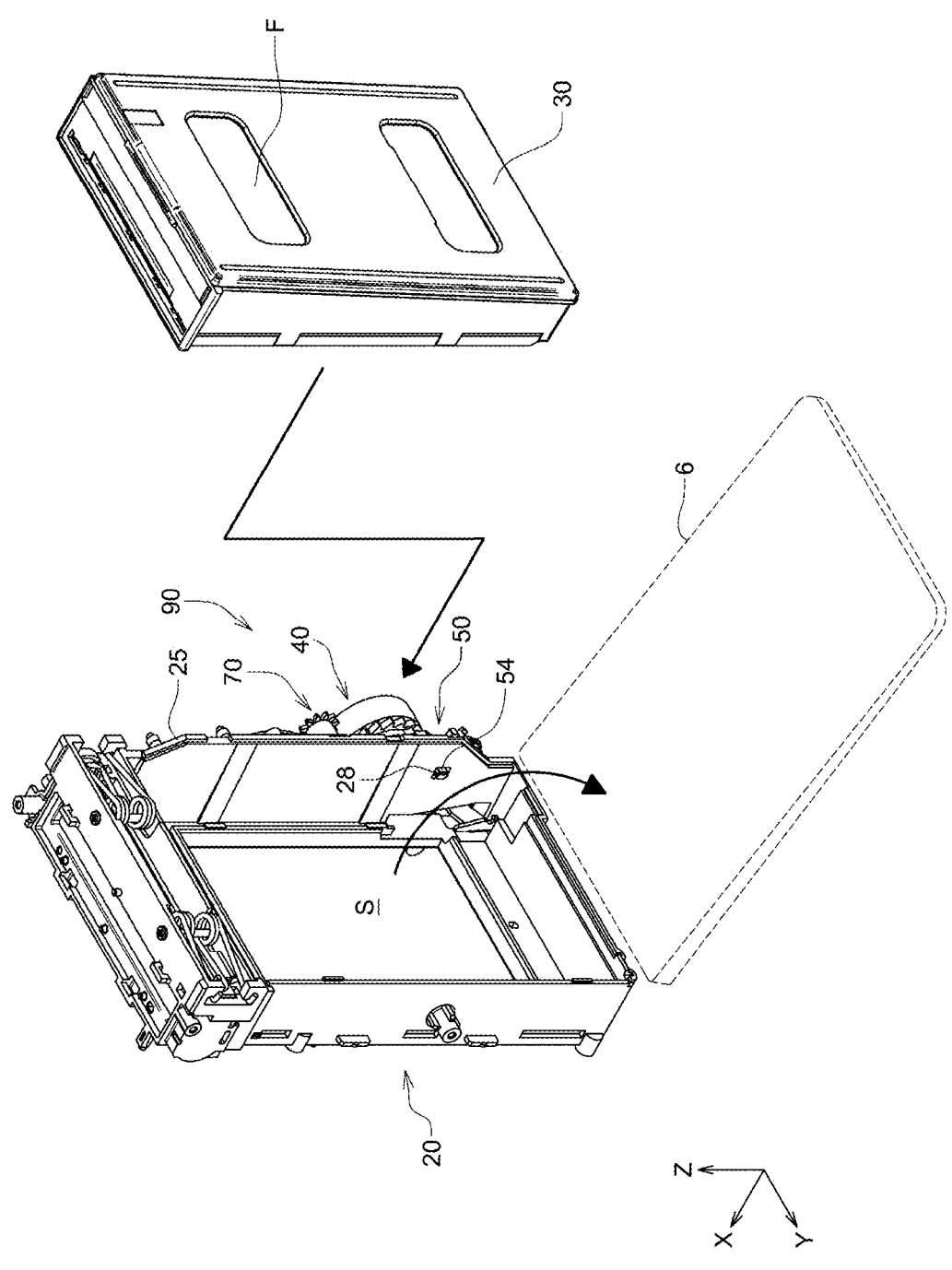
FIG. 4 is an exploded perspective view of the components shown in FIG. 3.
Figure 7:
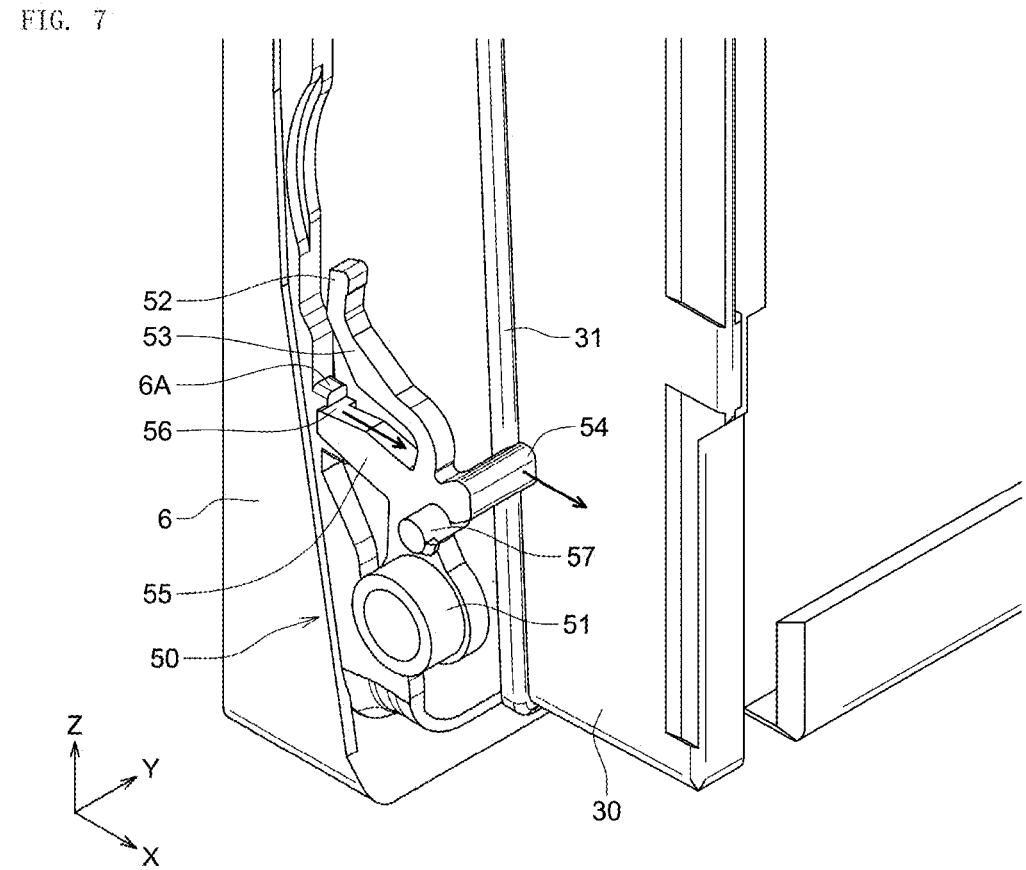
FIG. 7 is a perspective view of the stopper shown in FIG. 6A, a photographic film pack, and a door showing their relationship.

As shown in FIG. 4, the side wall 25 of the frame 20 has an opening 28 to receive the first contact tab 54 on the stopper 50. The first contact tab 54 on the stopper 50 protrudes through the opening 28 into the internal space S of the frame 20. FIG. 7 is a perspective view of the stopper 50, the film pack 30, and the door 6 showing their relationship. For ease of explanation, the components other than the stopper 50, the film pack 30, and the door 6 are not shown. As shown in FIG. 7, with the film pack 30 loaded in the internal space of the frame 20, the first contact tab 54 on the stopper 50 protruding through the opening 28 in the side wall 25 of the frame 20 into the internal space is in contact with an edge 31 of the film pack 30. Thus, the edge 31 of the film pack 30 pushes the first contact tab 54 on the stopper 50 in the positive X-direction, applying, to the stopper 50, a force against the above urging force $P_2$ from the torsion coil spring 82 in a direction opposite to the second rotation direction about the support shaft 22. This force rotates the stopper 50 from the stopper stop position in the direction opposite to the second rotation direction about the support shaft 22.

As shown in FIG. 7, with the door 6 closed, the second contact tab 56 on the stopper 50 is in contact with a contact portion 6A on the door 6. Thus, the contact portion 6A on the door 6 pushes the second contact tab 56 on the stopper 50 in the positive X-direction, applying, to the stopper 50, a force against the above urging force $P_2$ from the torsion coil spring 82 in the direction opposite to the second rotation direction about the support shaft 22. This force rotates the stopper 50 about the support shaft 22 from the stopper stop position in the direction opposite to the second rotation direction.

Thus, in the present embodiment, the first contact tab 54 on the stopper 50 receives a force in the direction opposite to the second rotation direction from the film pack 30 loaded in the internal space of the frame 20, and the second contact tab 56 receives a force in the direction opposite to the second rotation direction from the door 6 closing the opening 3A in the rear cover 3. Thus, each of the first contact tab 54 and the second contact tab 56 on the stopper 50 serves as a force receiver to receive a force in the direction opposite to the second rotation direction from the film pack 30 and the door 6.

As described above, the film pack 30 is loaded into the internal space of the frame 20 or the door 6 is closed to cause the stopper 50 to receive, from the film pack 30 or the door 6, a force against the urging force $P_2$ from the torsion coil spring 82. This rotates the stopper 50 from the stopper stop position in the direction opposite to the second rotation direction. The position of the stopper 50 in this state is hereafter referred to as a stopper actuation position.

Figure 8:
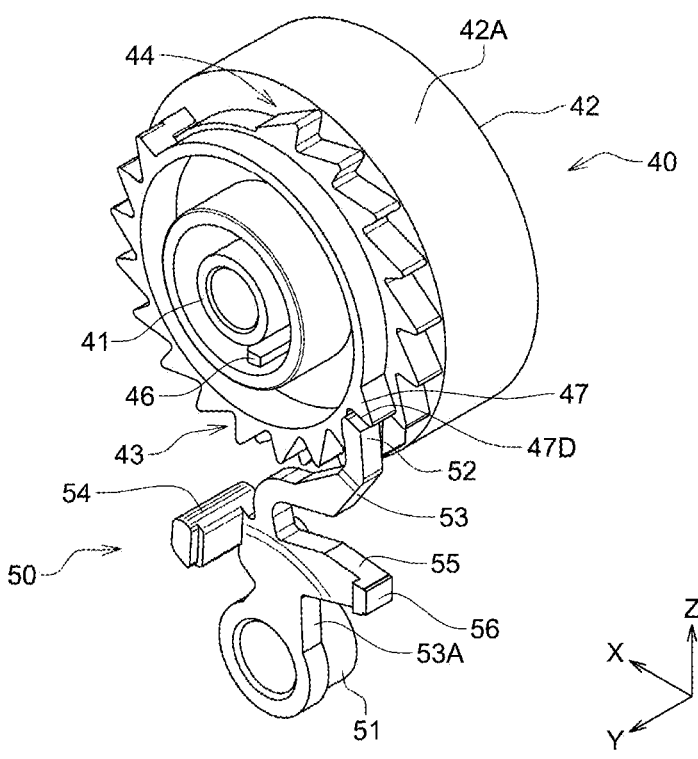
FIG. 8 is a perspective view of the counter shown in FIG. 5A and the stopper shown in FIG. 6A.

FIG. 8 is a perspective view of the stopper 50 and the counter 40 at the stopper actuation position. As described above, the counter 40 is urged in the first rotation direction under the urging force $P_1$ from the torsion coil spring 81. When the stopper 50 is at the stopper actuation position, as shown in FIG. 8, the engagement tab 52 on the stopper 50 engages with the engagement surface 47D of one of the projections 47 on the first engagement portion 43 on the counter 40. This restricts rotation of the counter 40 in the first rotation direction.

Figure 9A:
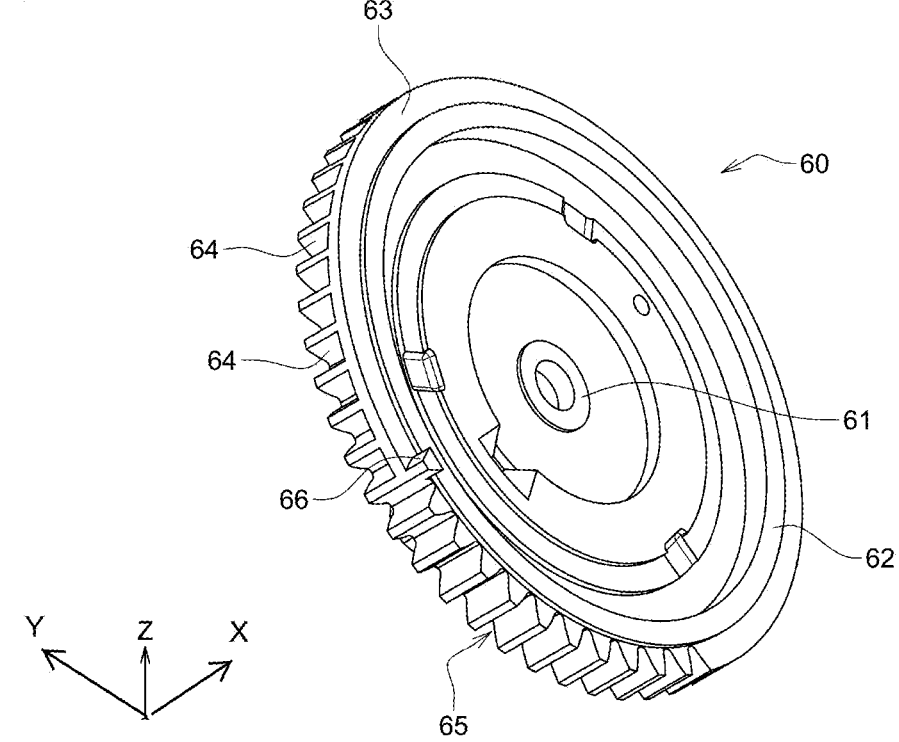
FIG. 9A is a perspective view of a rotary member shown in FIG. 3.
Figure 9B:
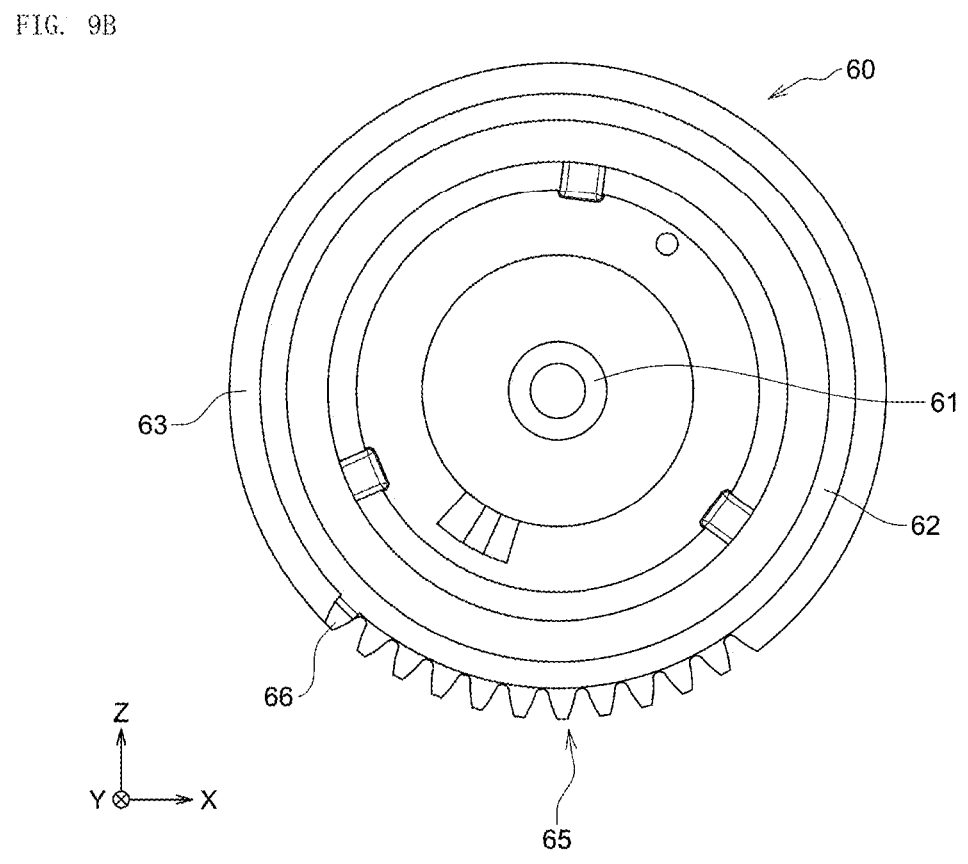
Figure 9C:
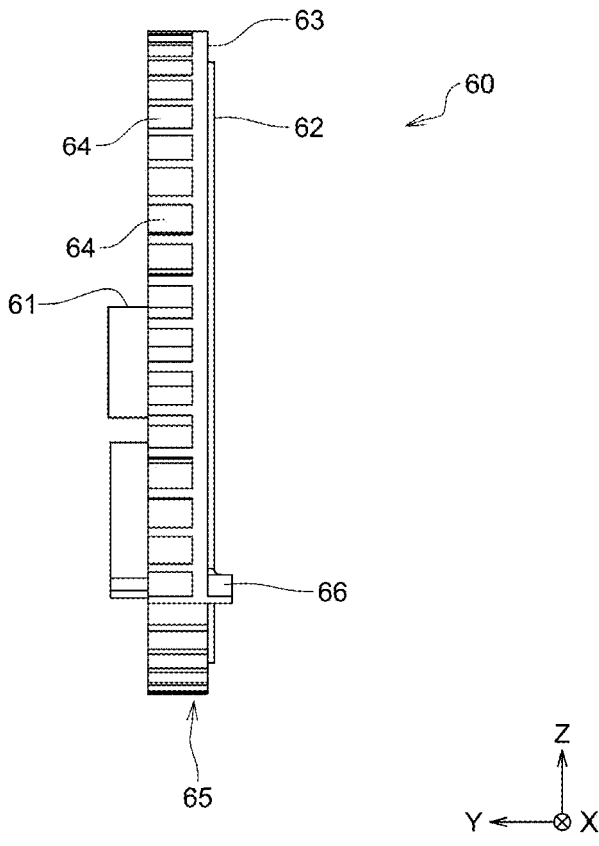
FIG. 9C is a rear view of the rotary member shown in FIG. 9A.

FIG. 9A is a perspective view of a rotary member 60. FIG. 9B is a left side view of the rotary member 60. FIG. 9C is a rear view of the rotary member 60. As shown in FIGS. 9A to 9C, the rotary member 60 includes a bearing 61, a flange 62, an outer edge 63, outer teeth 64, a drive gear 65, and an actuating projection 66. The bearing 61 receives the support shaft 23 on the frame 20. The flange 62 is located radially outside the bearing 61. The outer edge 63 extends radially outward from the flange 62. The outer teeth 64 are circumferentially aligned on a surface facing the positive Y-direction of the outer edge 63. The drive gear 65 corresponds to some of the outer teeth 64 extending in the negative Y-direction. The actuating projection 66 protrudes in the negative Y-direction from the outer edge 63 at a position circumferentially adjacent to the drive gear 65. The support shaft 23 on the frame 20 is received in the bearing 61. With the support shaft 23 received in the bearing 61, the rotary member 60 is rotatable about the support shaft 23.

The outer teeth 64 mesh with a gear (not shown) driven by a motor (not shown). The rotary member 60 thus rotates about the support shaft 23 driven by the motor. The motor is driven, for example, after photographing in response to a photographing operation performed with the camera 1, and rotates the rotary member 60 to actuate the counter assembly 90 (described later) to operate, as well as to actuate other assemblies (for example, an assembly to remove a photographic film F out of the film pack 30).

Figure 10A:
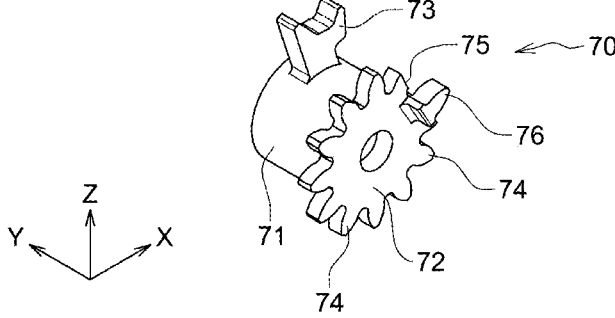
FIG. 10A is a perspective view of a drive cam shown in FIG. 3.
Figure 10B:
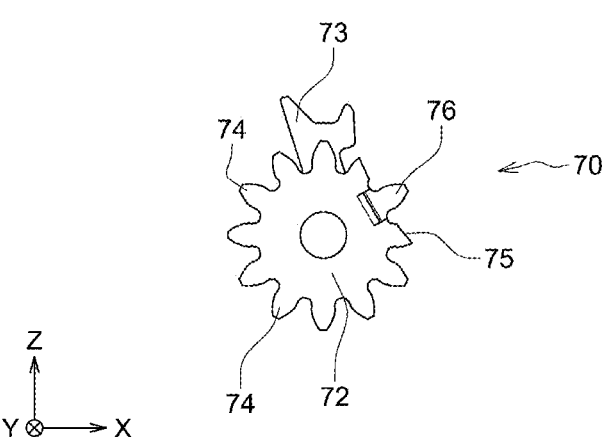
FIG. 10B is a left side view of the drive cam shown in FIG. 10A.
Figure 10C:
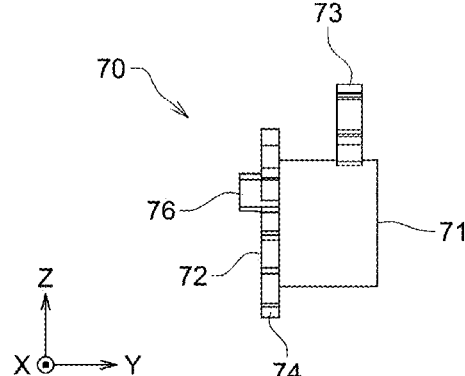
FIG. 10C is a front view of the drive cam shown in FIG. 10A.

FIG. 10A is a perspective view of the drive cam 70. FIG. 10B is a left side view of the drive cam 70. FIG. 10C is a front view of the drive cam 70. As shown in FIGS. 10A to 10C, the drive cam 70 includes a cylindrical bearing 71, a plate 72, a tooth portion 74, a pass-by portion 75, an engagement tab 76, and a cam portion 73 as a tab. The bearing 71 extends in Y-direction. The plate 72 is located at an end in the negative Y-direction of the bearing 71. The tooth portion 74 includes multiple teeth protruding radially outward from the plate 72 at predetermined intervals in the circumferential direction. The pass-by portion 75 is located circumferentially adjacent to the tooth portion 74. The engagement tab 76 is located at substantially the center of the pass-by portion 75. The cam portion 73 extends radially outward from the bearing 71. The support shaft 24 on the frame 20 is received in the bearing 71. With the support shaft 24 received in the bearing 71, the drive cam 70 is rotatable about the support shaft 24.

The pass-by portion 75 includes a surface facing and separated from the outer edge 63 of the rotary member 60 to allow the rotary member 60 to pass when the rotary member 60 is separated from the pass-by portion 75 (described later). The engagement tab 76 protrudes from the plate 72 in the negative Y-direction and extends radially outward to engage with the actuating projection 66 on the rotary member 60 (described later). The cam portion 73 engages with the second engagement portion 44 on the counter 40 when the drive cam 70 rotates about the support shaft 24 (described later).

Figure 11:
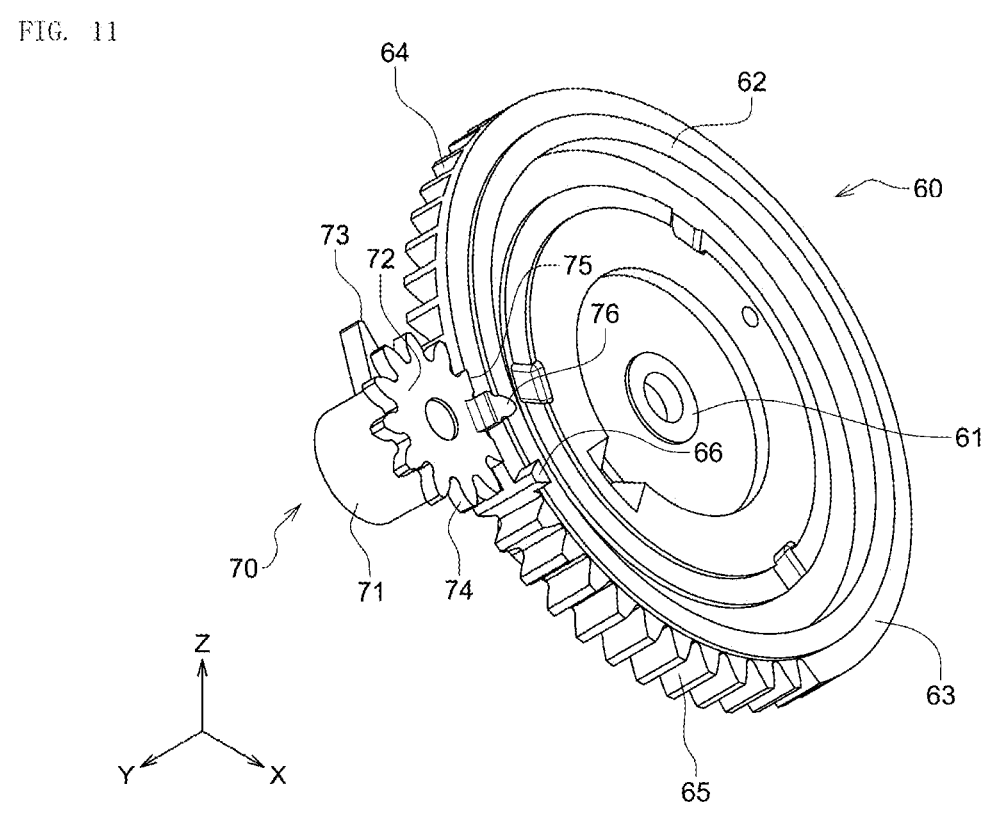
FIG. 11 is a perspective view of the rotary member shown in FIG. 9A and the drive cam shown in FIG. 10A.

FIG. 11 is a perspective view of the rotary member 60 and the drive cam 70. As shown in FIG. 11, the positions of the tooth portion 74 and the pass-by portion 75 on the drive cam 70 in Y-direction are substantially the same as the position of the outer edge 63 of the rotary member 60 in Y-direction. As shown in FIG. 11, the pass-by portion 75 on the drive cam 70 faces the outer edge 63 (and the drive gear 65) of the rotary member 60 to be separated from the outer circumferential surface of the outer edge 63 (and the drive gear 65). When the pass-by portion 75 on the drive cam 70 faces the outer circumferential surface of the outer edge 63 (and the drive gear 65) of the rotary member 60, the pass-by portion 75 is separated from the rotary member 60. Thus, the rotary member 60 passes near the drive cam 70 without interacting with the drive cam 70.

However, with the drive gear 65 being at the same height as the outer edge 63 of the rotary member 60 in Y-direction, the tooth portion 74 on the drive cam 70 can mesh with the drive gear 65 on the rotary member 60. While the tooth portion 74 on the drive cam 70 and the drive gear 65 on the rotary member 60 meshing with each other, rotation of the rotary member 60 rotates the drive cam 70 about the support shaft 24.

The position of the engagement tab 76 on the drive cam 70 in Y-direction is substantially the same as the position of the actuating projection 66 on the rotary member 60 in Y-direction. Thus, as the rotary member 60 rotates, the engagement tab 76 on the drive cam 70 engages with the actuating projection 66 on the rotary member 60. With the engagement tab 76 on the drive cam 70 and the actuating projection 66 of the rotary member 60 engaged with each other, rotation of the rotary member 60 rotates the drive cam 70 about the support shaft 24.

Figure 12A:
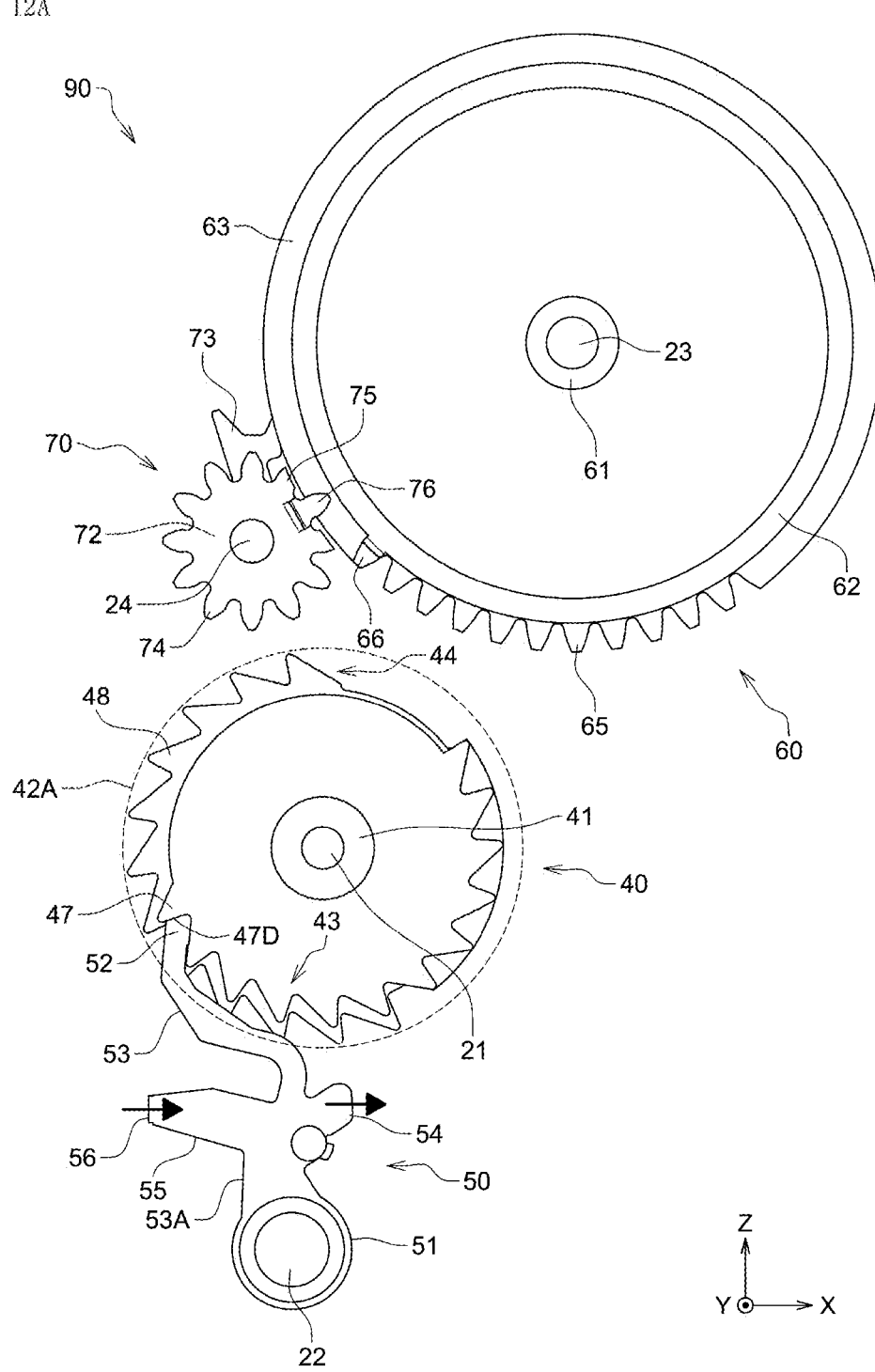
FIG. 12A is a schematic diagram describing the operation of a counter assembly shown in FIG. 3.

FIG. 12A is a schematic diagram of the counter assembly 90 before photographing. To perform photographing, the film pack 30 is loaded into the internal space of the frame 20, and the door 6 is closed. As indicated by the arrows in FIG. 12A, this causes the film pack 30 and the door 6 to push the stopper 50 in the positive X-direction to hold the stopper 50 at the stopper stop position shown in FIG. 12A against the urging force $P_2$ from the torsion coil spring 82 (refer to FIG. 3).

When the stopper 50 is at the stopper actuation position, the engagement tab 52 on the stopper 50 engages with the engagement surface 47D of one of the projections 47 in the first engagement portion 43 on the counter 40. Thus, the engagement tab 52 on the stopper 50 restricts rotation of the counter 40 in the first rotation direction (counterclockwise in FIG. 12A) to hold the counter 40 at the same position. For example, the counter 40 is held at a position at which the indication of 10 on the outer circumferential surface 42A of the cylinder 42 in the counter 40 is viewable through the window 3B in the rear cover 3. The indication of 10 indicates the number of photographic films F remaining in the film pack 30. Thus, the user of the camera 1 can know that 10 more photographs can be captured from the indication of 10 viewable through the window 3B in the rear cover 3. The state shown in FIG. 12A is hereafter referred to as an initial state.

In the initial state, as shown in FIG. 12A, the pass-by portion 75 on the drive cam 70 faces the outer edge 63 of the rotary member 60, and the tooth portion 74 on the drive cam 70 does not mesh with the drive gear 65 on the rotary member 60. Thus, the drive cam 70 is stationary at the position shown in FIG. 12A, without being affected by rotation of the rotary member 60.

In response to the release button 9 being pressed by the user, a photographing operation starts, causing a photographic film F in the film pack 30 to undergo exposure for capturing a photograph. After photographing, the motor (not shown) is driven to rotate the rotary member 60 about the support shaft 23 (clockwise in FIG. 12A). The rotation of the rotary member 60 drives an assembly (not shown) to move the photographic film F after photographing in the positive Z-direction out of the film pack 30, thus ejecting the photographic film through the ejection slit 4A (refer to FIG. 1) in the top cover 4.

After the rotary member 60 starts rotating clockwise from the initial state in which the pass-by portion 75 on the drive cam 70 faces the outer edge 63 of the rotary member 60, the drive cam 70 remains stationary for a certain period while the rotary member 60 is passing near the pass-by portion 75 on the drive cam 70.

Figure 12B:
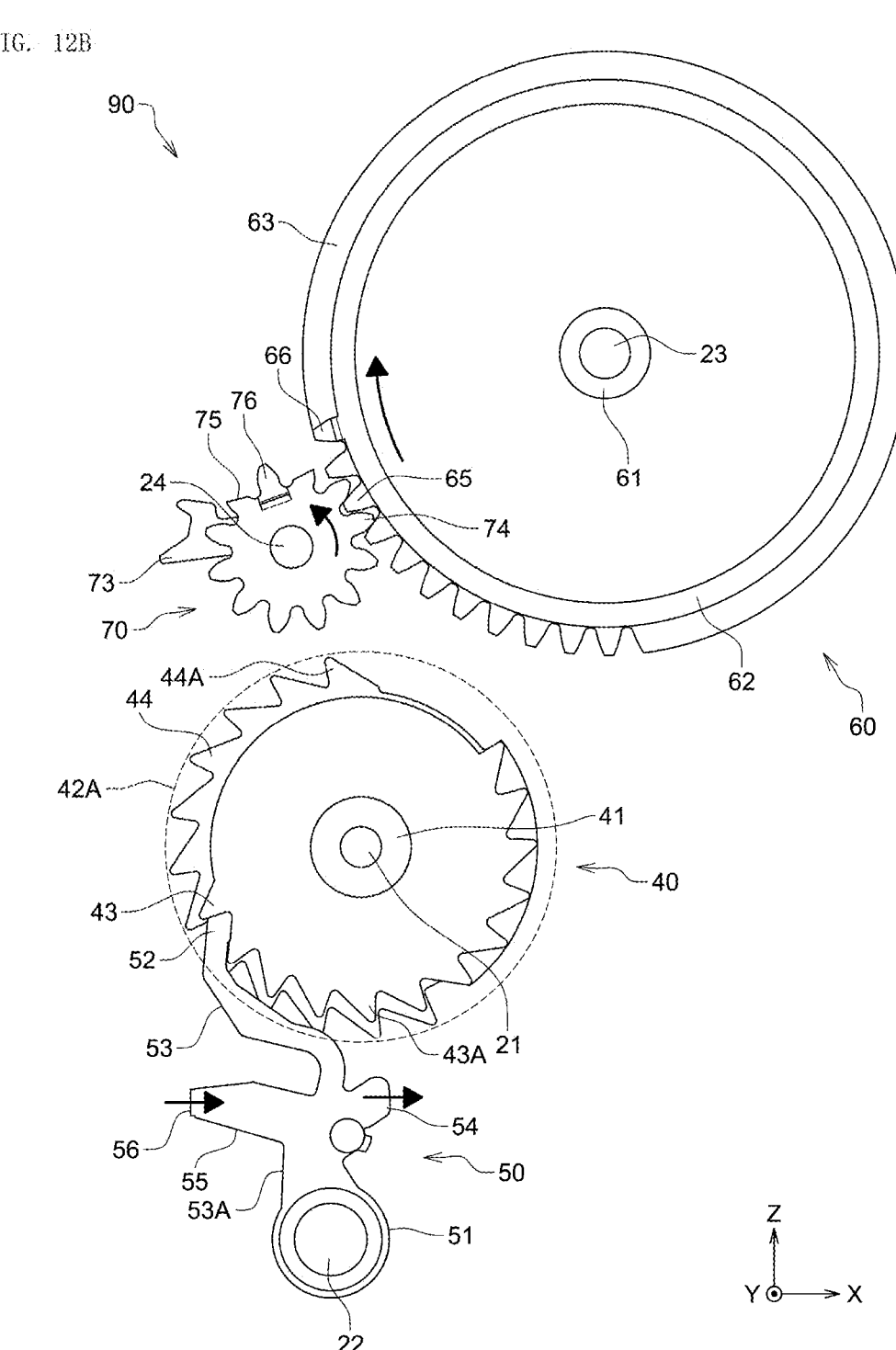
FIG. 12B is a schematic diagram describing the operation of the counter assembly shown in FIG. 3.

As the rotary member 60 rotates further clockwise, the actuating projection 66 on the rotary member 60 engages with the engagement tab 76 on the drive cam 70. The engagement between the engagement tab 76 on the drive cam 70 and the actuating projection 66 on the rotary member 60 causes the drive cam 70 to rotate about the support shaft 24 counterclockwise in FIG. 12A. With the tooth portion 74 located clockwise from the pass-by portion 75 on the drive cam 70 and adjacent to the pass-by portion 75 and the drive gear 65 located counterclockwise from the actuating projection 66 on the rotary member 60 and adjacent to the actuating projection 66, the counterclockwise rotation of the drive cam 70 causes, as shown in FIG. 12B, the tooth portion 74 on the drive cam 70 to mesh with the drive gear 65 on the rotary member 60. As the rotary member 60 rotates clockwise, the drive cam 70 rotates counterclockwise.

Figure 12C:
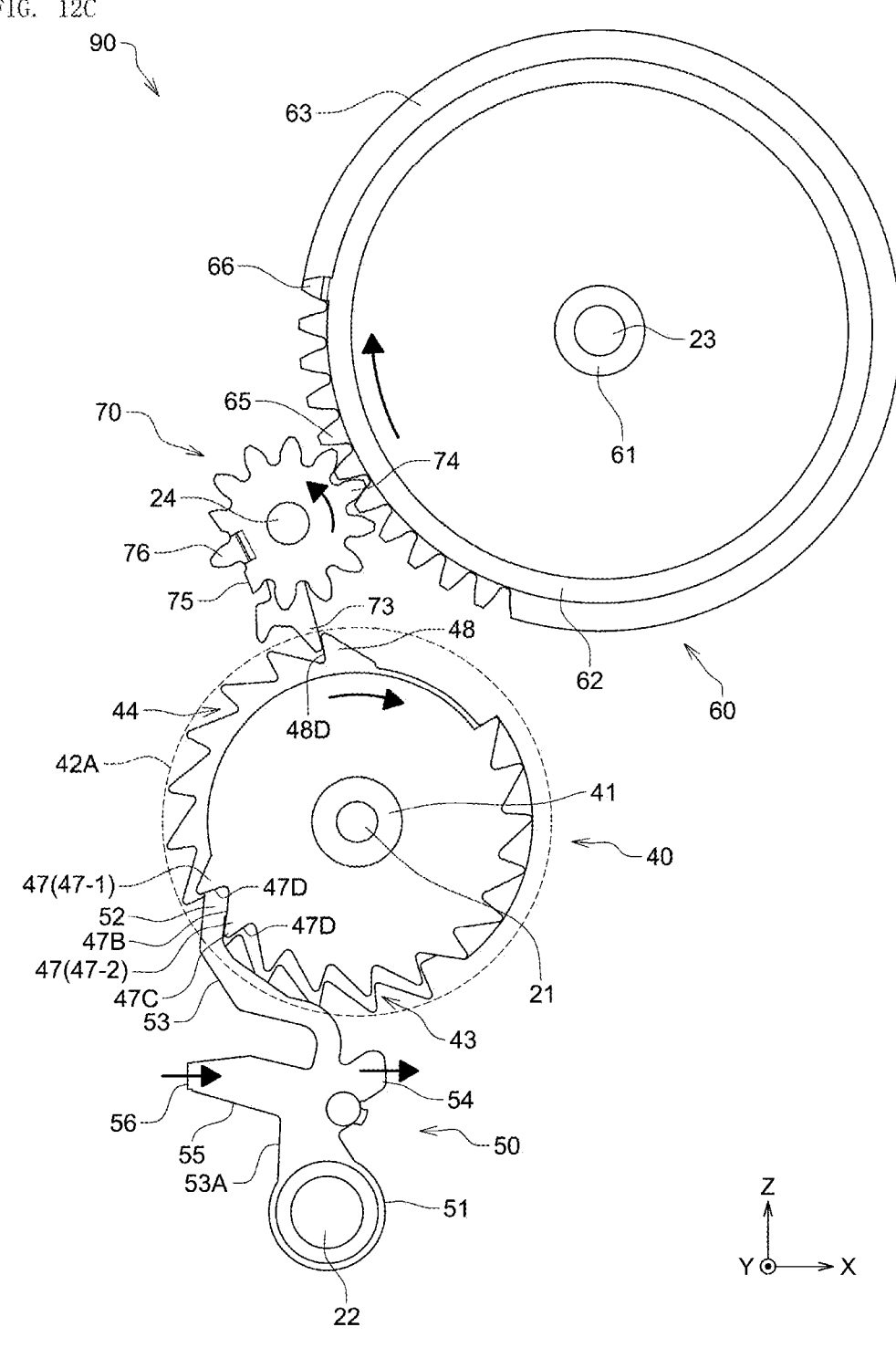
FIG. 12C is a schematic diagram describing the operation of the counter assembly shown in FIG. 3.

As the drive cam 70 rotates counterclockwise in this manner, the cam portion 73 on the drive cam 70 then engages with the engagement surface 48D of one of the projections 48 on the second engagement portion 44 on the counter 40, as shown in FIG. 12C. As the drive cam 70 rotates further counterclockwise in this state, the counter 40 rotates clockwise about the support shaft 21 against the urging force $P_1$ from the torsion coil spring 81.

Figure 12D:
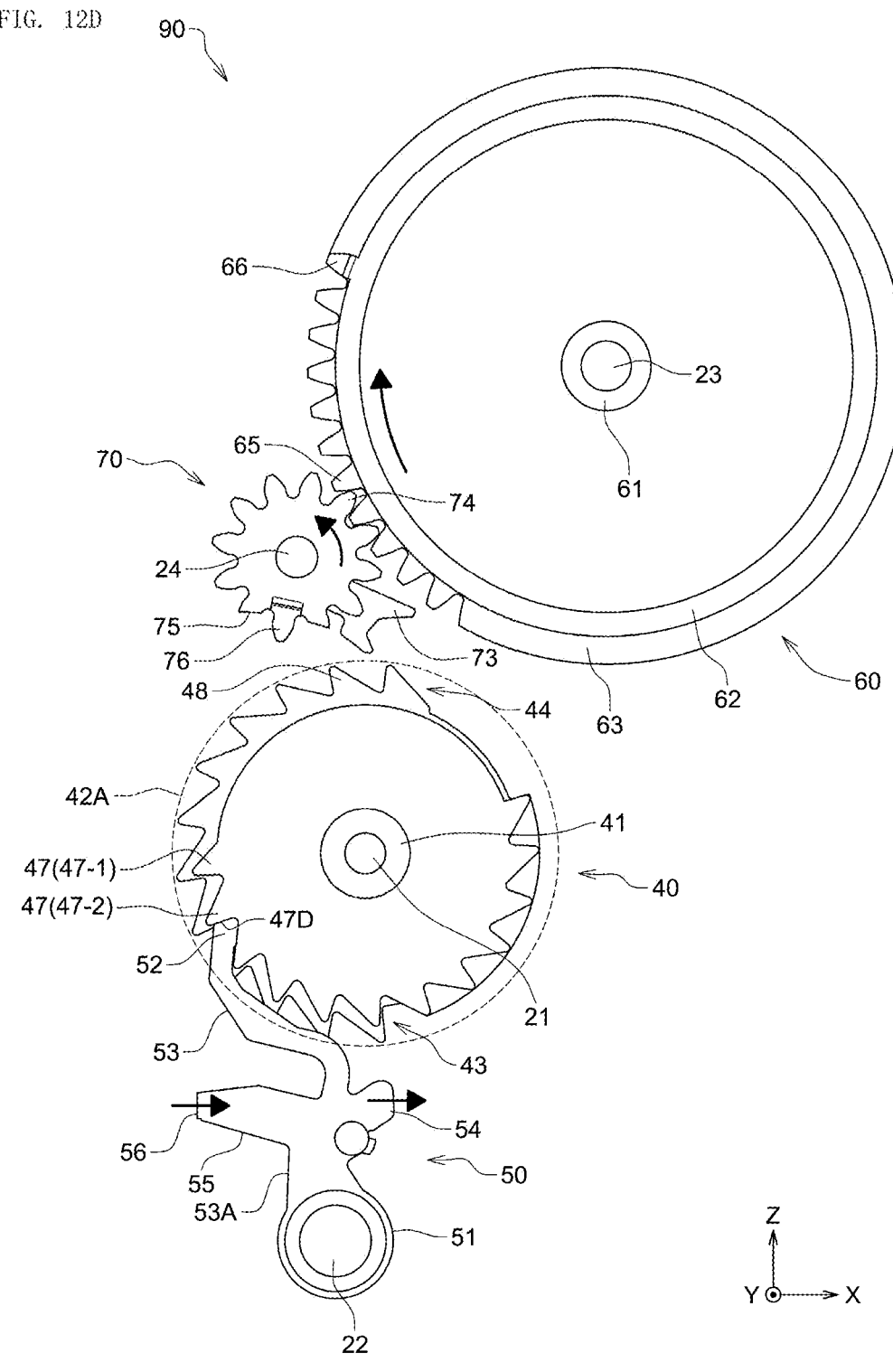
FIG. 12D is a schematic diagram describing the operation of the counter assembly shown in FIG. 3.

As the counter 40 rotates clockwise from the state shown in FIG. 12C, the engagement tab 52 on the stopper 50 engaged with the engagement surface 47D of one of the projections 47 (projection 47-1) on the first engagement portion 43 on the counter 40 slides along the slope 47B of an adjacent projection 47-2 and moves over the apex 47C of the projection 47-2 to engage with another engagement surface 47D as shown in FIG. 12D. Thus, the counter 40 is held at a position rotated clockwise about the support shaft 21 by an angular distance between the adjacent projections 47 (47-1 and 47-2). The indication of 9 on the outer circumferential surface 42A of the cylinder 42 in the counter 40 has moved to a position viewable through the window 3B in the rear cover 3. The indication of 9 viewable through the window 3B allows the user to know that nine more photographs can be captured. Thus, the rotary member 60 and the drive cam 70 in the present embodiment serve as a drive to rotate the counter 40 in the direction opposite to the first rotation direction (clockwise in FIGS. 12C and 12D).

Figure 12E:
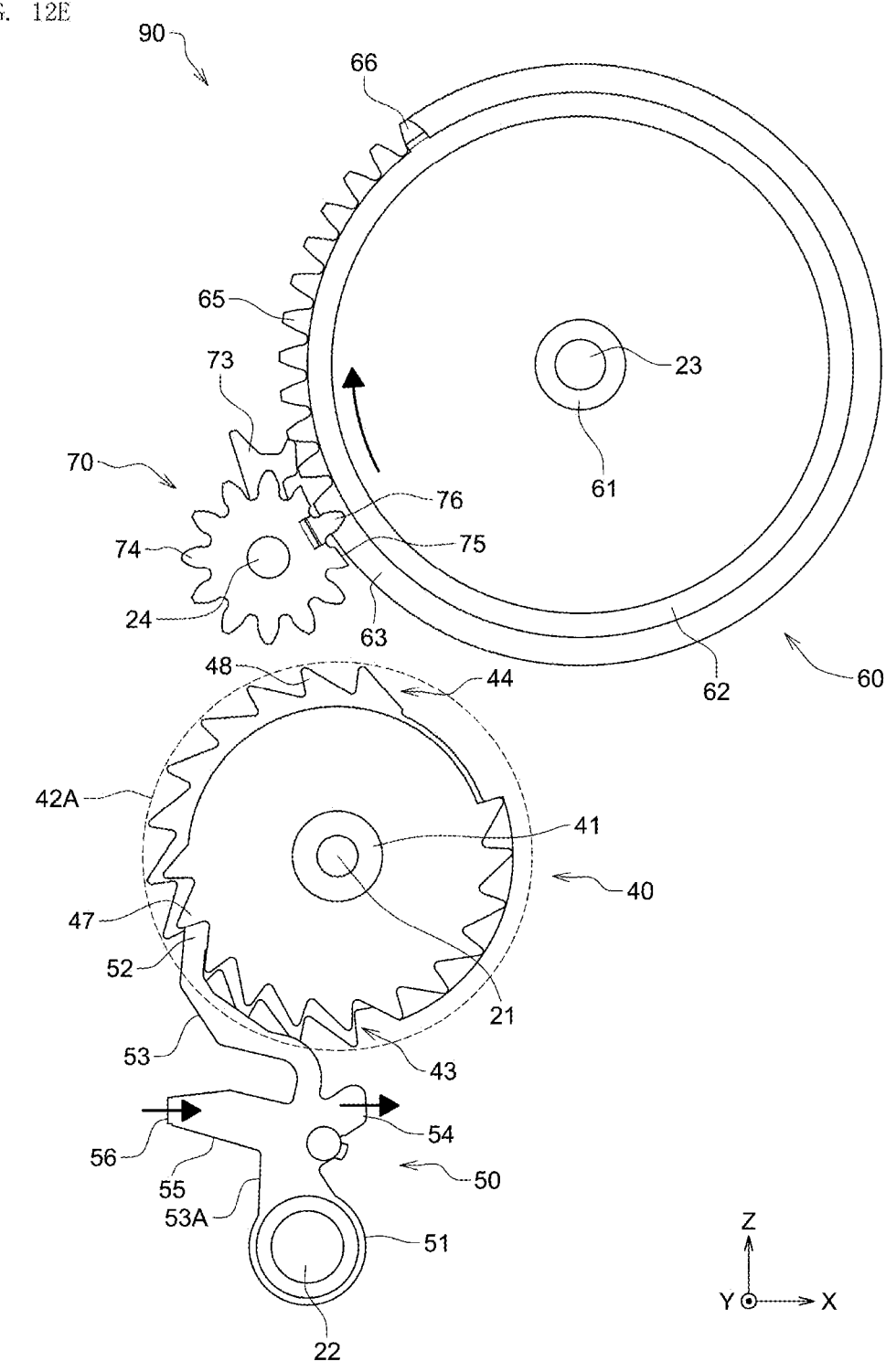
FIG. 12E is a schematic diagram describing the operation of the counter assembly shown in FIG. 3.

The drive cam 70, as shown in FIG. 12D, continues to rotate together with the rotary member 60 with the tooth portion 74 meshing with the drive gear 65 on the rotary member 60. As shown in FIG. 12E, upon completion of meshing between the tooth portion 74 on the drive cam 70 and the drive gear 65 on the rotary member 60, the pass-by portion 75 adjacent to the tooth portion 74 on the drive cam 70 comes to face the outer edge 63 adjacent to the drive gear 65 on the rotary member 60. Thus, upon completion of meshing between the tooth portion 74 on the drive cam 70 and the drive gear 65 on the rotary member 60 as the drive cam 70 and the rotary member 60 rotate, the pass-by portion 75 on the drive cam 70 faces the outer edge 63 of the rotary member 60 as shown in FIG. 12E. This causes the rotary member 60 to pass while being separated from the drive cam 70 and causes the drive cam 70 to stop rotating and to be stationary at the position. The rotary member 60 driven by the motor continues to rotate to a predetermined standby position (a position shown in FIG. 12A).

Thus, the counter assembly 90 in the present embodiment allows the number of photographic films F remaining in the film pack 30 to be indicated through the window 3B in the rear cover 3 when the rotary member 60 rotates to rotate the counter 40 by a predetermined angle each time a photographing operation ends.

For example, when all the photographic films F in the film pack 30 are used, the film pack 30 is to be replaced with a new one. In this case, the door 6 is open as shown in FIG. 4, and the film pack 30 is removed from the internal space of the frame 20 through the opening 3A in the rear cover 3. Once the film pack 30 is removed, the first contact tab 54 on the stopper 50 is no longer pushed in the positive X-direction by the edge 31 (refer to FIG. 7) of the film pack 30, and the second contact tab 56 is also no longer pushed by the contact portion 6A (refer to FIG. 7) on the door 6. This causes the stopper 50 to rotate under the urging force $P_2$ from the torsion coil spring 82 in the second rotation direction (counterclockwise in FIG. 12A) about the support shaft 22 to the stopper stop position. This moves the engagement tab 52 on the stopper 50 radially outward from the first engagement portion 43 on the counter 40, thus disengaging the engagement tab 52 on the stopper 50 from the first engagement portion 43 on the counter 40. As described above, the counter 40 is urged in the first rotation direction (counterclockwise in FIG. 12A) by the torsion coil spring 81. When the engagement tab 52 on the stopper 50 and the first engagement portion 43 on the counter 40 are disengaged, the counter 40 is rotated under the urging force $P_1$ from the torsion coil spring 81 about the support shaft 21 in the first rotation direction. When the counter 40 is reset to the counter stop position (initial position) in the manner described above, the indication viewable through the window 3B in the rear cover 3 is reset to a character, such as S, indicating the initial state. Thus, the user of the camera 1 can know that the film pack 30 is unloaded or unused from the indication of S viewable through the window 3B in the rear cover 3.

In the present embodiment, the rotary member 60 is rotated to engage the cam portion 73 on the drive cam 70 with one of the projections 48 (second projections) on the second engagement portion 44 on the counter 40, thus rotating the counter 40 in the direction opposite to the first rotation direction. Once the counter 40 is rotated, the engagement tab 52 on the stopper 50 engages with the projection 47 on the first engagement portion 43 on the counter 40, thus holding the counter 40 at the rotational position. Thus, the indication on the counter 40 viewable through the window 3B in the rear cover 3 is changed when the rotary member 60 is rotated at an intended timing. As described above, an inexpensive and compact structure can indicate a count in an intended manner without using an expensive component such as a liquid crystal display (LCD) panel or a circuit board.

A spring may be placed between, for example, the counter 40 and the door 6 to hold the counter 40 at its position under a force from the spring. In this case, however, the door 6 may deform, when the camera 1 is dropped or placed in a high temperature environment for a long period, and the spring may apply a less urging force. In the counter assembly 90 in the present embodiment, a force received by the force receivers (the first contact tab 54 and the second contact tab 56) in the stopper 50 from at least one of the film pack 30 or the door 6 causes the engagement tab 52 to engage with one of the projections 47 (first projections) on the first engagement portion 43 on the counter 40, thus restricting rotation of the counter 40 in the first rotation direction. Although the door 6 is deformed when the camera 1 is dropped or placed in a high temperature environment, the force receivers continue to receive a force either from the film pack 30 or the door 6, continuing to constantly restrict the rotation of the counter 40.

In the embodiment described above, as shown in FIG. 8, the connector 53 connecting the bearing 51 in the stopper 50 to the engagement tab 52 extends from the bearing 51 along the outer circumference of the first engagement portion 43 on the counter 40. The bearing 51 and the engagement tab 52 connected with the connector 53 extending from the bearing 51 along the outer circumference of the first engagement portion 43 on the counter 40 in this manner reduces sounds generated from the engagement tab 52 on the stopper 50 moving over the apex 47C of each projection 47 on the first engagement portion 43 on the counter 40.

In the above embodiment, the force receivers in the stopper 50 include the first contact tab 54 to be pushed by the film pack 30 and the second contact tab 56 to be pushed by the door 6, but the force receivers in the stopper 50 may include one of these contact tabs (contactors).

In the embodiment described above, the first engagement portion 43 and the second engagement portion 44 on the counter 40 are separate members, but the first engagement portion 43 and the second engagement portion 44 may be integral with each other to be continuous in the circumferential direction.

The counter assembly 90 in the above embodiment indicates the number of photographic films F remaining in the film pack 30, but the counter assembly 90 may be used to indicate a count other than the number of remaining photographic films F. In such cases, the camera 1 may not include the door 6 or the film pack 30.

As described above, the camera according to one or more embodiments of the present invention may have the structures described below.

First Structure
    A camera, comprising:
        a housing including a door to open and close an opening for placing and removing a photographic film pack to be loaded inside;
        a frame accommodated in the housing;

11 a counter rotatable about a first support shaft on the frame, the counter including a display surface configured to change an indication in a circumferential direction, and a first engagement portion including a plurality of first projections aligned in the circumferential direction;

a first urging member configured to urge the counter in a first rotation direction about the first support shaft;

a drive configured to rotate the counter in a direction opposite to the first rotation direction;

a stopper rotatable about a second support shaft on the frame; and a second urging member configured to urge the stopper in a second rotation direction about the second support shaft, the stopper including a force receiver configured to receive a force acting in a direction opposite to the second rotation direction from at least one of the photographic film pack loaded inside the housing or the door closing the opening, and an engagement tab engageable with one of the plurality of first projections on the first engagement portion on the counter under a force received by the force receiver to restrict rotation of the counter in the first rotation direction.

Second Structure

The camera according to the first structure, wherein the force receiver includes a first contactor pushable by the photographic film pack.

Third Structure

The camera according to the first structure or the second structure, wherein the force receiver includes a second contactor pushable by the door.

Fourth Structure

The camera according to any one of the first to third structures, wherein the stopper further includes a bearing receiving the second support shaft, and a connector extending from the bearing along an outer circumference of the first engagement portion on the counter and connecting the bearing to the engagement tab.

Fifth Structure

The camera according to any one of the first to fourth structures, wherein the drive rotates the counter in response to a photographing operation.

Sixth Structure

The camera according to any one of the first to fifth structures, wherein the counter further includes a second engagement portion including a plurality of second projections aligned in the circumferential direction, and the drive includes a rotary member rotatable about a third support shaft on the frame, and including a drive gear extending in a circumferential direction, and a drive cam rotatable about a fourth support shaft on the frame, the dive cam including a gear portion meshing with the drive gear in the rotary member, and a cam portion engageable with the second engagement portion on the counter to rotate the counter in the direction opposite to the first rotation direction.

12

Seventh Structure

The camera according to the sixth structure, wherein the rotary member further includes an actuating projection located adjacent to the drive gear, and the drive cam includes an engagement tab engageable with the actuating projection on the rotary member, and a pass-by portion located circumferentially adjacent to the gear portion and configured to pass the rotary member while being separated from the rotary member.

Eighth Structure

The camera according to any one of the first to seventh structures, wherein the display surface in the counter includes circumferential and sequential indications of a number of photographic films remaining in the photographic film pack loaded in the housing.

Although the embodiments of the present invention have been described above, the present invention is not limited to the above embodiments and may be modified variously within the scope of its technical idea.

What is claimed is:

1. A camera, comprising:

a housing including a door to open and close an opening for placing and removing a photographic film pack to be loaded inside;

a frame accommodated in the housing;

a counter rotatable about a first support shaft on the frame, the counter including a display surface configured to change an indication in a circumferential direction, and a first engagement portion including a plurality of first projections aligned in the circumferential direction;

a first urging member configured to urge the counter in a first rotation direction about the first support shaft;

a drive configured to rotate the counter in a direction opposite to the first rotation direction;

a stopper rotatable about a second support shaft on the frame; and a second urging member configured to urge the stopper in a second rotation direction about the second support shaft, the stopper including a force receiver configured to receive a force acting in a direction opposite to the second rotation direction from at least one of the photographic film pack loaded inside the housing or the door closing the opening, and an engagement tab engageable with one of the plurality of first projections on the first engagement portion on the counter under a force received by the force receiver to restrict rotation of the counter in the first rotation direction, the force receiver includes:

a first contactor pushable by the photographic film pack in a first direction, wherein the first contactor extends from a connection portion in a second direction to contact the photographic film pack, and the first contactor comprises a surface parallel to the photographic film pack, and a second contactor pushable by the door in the first direction, wherein the second contactor extends from an arm portion in the second direction to contact the door, and the second contactor comprises a surface parallel to the door, and the one of the plurality of first projections is configured to force the engagement tab in the first direction.

2. The camera according to claim 1, wherein
the stopper further includes
  a bearing receiving the second support shaft, and
  a connector extending from the bearing along an outer
    circumference of the first engagement portion on the
    counter and connecting the bearing to the engage-
    ment tab.
3. The camera according to claim 1, wherein
the drive rotates the counter in response to a photograph-
  ing operation.
4. The camera according to claim 1, wherein
the display surface in the counter includes circumferential
  and sequential indications of a number of photographic
  films remaining in the photographic film pack loaded in
  the housing.
5. A camera, comprising:
a housing including a door to open and close an opening
  for placing and removing a photographic film pack to
  be loaded inside;
a frame accommodated in the housing;
a counter rotatable about a first support shaft on the frame,
  the counter including a display surface configured to
  change an indication in a circumferential direction, and
a first engagement portion including a plurality of first
projections aligned in the circumferential direction;
  a first urging member configured to urge the counter in a
    first rotation direction about the first support shaft;
  a drive configured to rotate the counter in a direction
    opposite to the first rotation direction;
  a stopper rotatable about a second support shaft on the
    frame; and
  a second urging member configured to urge the stopper in
    a second rotation direction about the second support
    shaft, the stopper including
  a force receiver configured to receive a force acting in
    a direction opposite to the second rotation direction
    from at least one of the photographic film pack
    loaded inside the housing or the door closing the
    opening, and
an engagement tab engageable with one of the plurality of
first projections on the first engagement portion on the
counter under a force received by the force receiver to
restrict rotation of the counter in the first rotation direction,
wherein
  the counter further includes a second engagement portion
    including a plurality of second projections aligned in
    the circumferential direction, and
  the drive includes
    a rotary member rotatable about a third support shaft on
      the frame, and including a drive gear extending in a
      circumferential direction, and
    a drive cam rotatable about a fourth support shaft on the
      frame, the dive cam including
  a gear portion meshing with the drive gear in the rotary
    member, and
  a cam portion engageable with the second engagement
    portion on the counter to rotate the counter in the
    direction opposite to the first rotation direction.
6. The camera according to claim 5, wherein
the rotary member further includes an actuating projection
  located adjacent to the drive gear, and
the drive cam includes
  an engagement tab engageable with the actuating pro-
    jection on the rotary member, and
  a pass-by portion located circumferentially adjacent to
    the gear portion and configured to pass the rotary
    member while being separated from the rotary mem-
    ber.

\* \* \* \* \*